May 27, 1924.

M. J. HEIDELBERG

TRAP FLUSHING DEVICE

Filed June 10, 1921

1,495,303

Inventor:
MICHAEL J. HEIDELBERG,
By John H. Bruninga
His Attorney.

Patented May 27, 1924.

1,495,303

UNITED STATES PATENT OFFICE.

MICHAEL J. HEIDELBERG, OF ST. LOUIS, MISSOURI.

TRAP-FLUSHING DEVICE.

Application filed June 10, 1921. Serial No. 476,502.

*To all whom it may concern:*

Be it known that I, MICHAEL J. HEIDELBERG, a citizen of the United States, and residing at St. Louis, Missouri, have invented the new and useful Improvements in Trap-Flushing Devices, of which the following is a specification.

This invention relates to devices for clearing waste pipes and is more particularly adapted to a device for clearing and flushing the trap in a waste pipe.

It often happens that a waste pipe is obstructed by the accumulation of matter in the trap. When this happens and there is no other obstruction in the pipe, it is practically impossible to clear the obstruction by the usual method of applying hydraulic pressure, since there is nothing to sustain this pressure in the open section of the pipe. It may also happen that the obstruction does not completely close the pipe so that in the hydraulic pressure method, the pressure could not be built up to the desired point on account of the leakage through the opening.

One of the objects of this invention, therefore, is to provide means adapted to remove obstructions in the trap or the adjacent connections thereto, even when such obstructions do not permit the application of hydraulic pressure.

Another object is to provide a trap flushing device which will direct a flushing stream along the trap and the adjacent connections thereto.

Another object of this invention is to provide a flushing device which will be readily insertible into the trap so as to be positioned therein and to which a force pump may be attached.

Further objects will appear from the detail description taken in connection with the accompanying drawing, in which.

Figure 1:
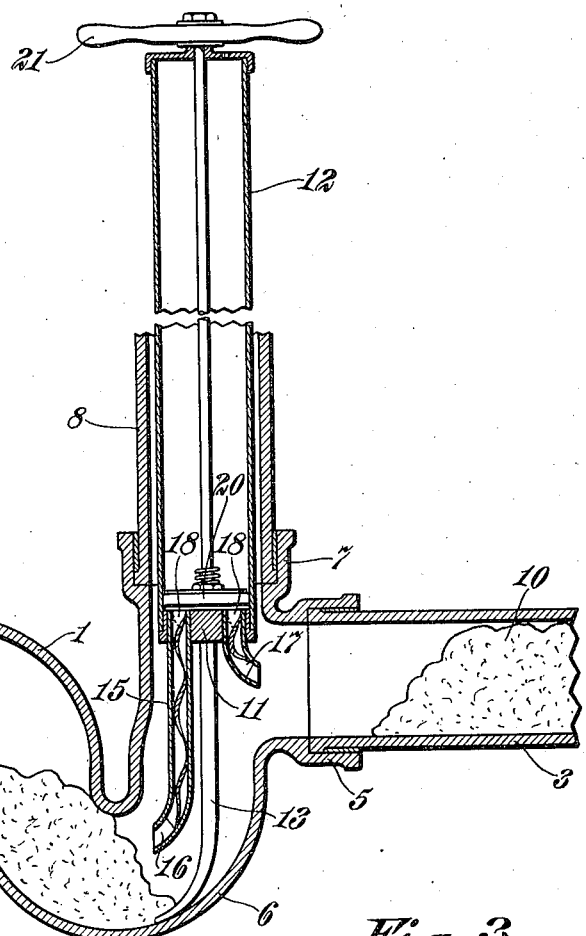
Figure 1 is a sectional view showing a section of the waste pipe with the device embodying this invention in position in the trap.

Referring to the accompanying drawing, 1 represents the trap of a waste pipe having adjacent connections 2 and 3. The trap 1 is of the ordinary form having horizontally disposed sections 4 and 5 and a downwardly extending U-shaped belly 6. Adjacent the horizontal section 5 is an upwardly extending vertical section or neck 7. The sections 4, 5 and 7 are provided with the usual means for connecting two adjacent sections of pipe. These parts are usually located underground and are arranged so that the neck 7 or a connection 8 thereto will be accessible from the surface of the ground, the same being provided with an appropriate closure to prevent the entrance of foreign matter thereto.

Figure 2:
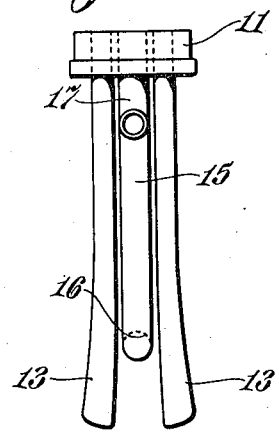
Figure 2 is a view in elevation of the flushing head.
Figure 3:
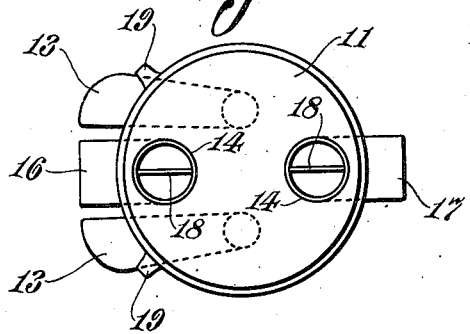
Figure 3 is a plan view of said head.

Upon obstruction of the waste pipe with foreign matter 9 or 10, the closure for the pipe 8 may be removed and the device inserted. This device comprises a head as shown in Figures 2 and 3 having a flange 11 adapted for connection to a force pump 12. The flange 11 is provided on its lower side with a pair of downwardly extending feet 13 adapted to rest on the bottom of the belly 6 of the trap when the device is inserted thereinto so as to position the device in the trap. The flange 11 is perforated in two places as shown at 14 in Figure 3. At one of these perforations a flushing nozzle 15 is attached, the end 16 of which is turned laterally so as to direct the stream therefrom along the belly of the trap as shown in Figure 1. This nozzle 15 is of extended length so that the end 16 will be positioned opposite the lower passage of the belly 6 of the trap. Another flushing nozzle 17 is attached at the other perforation 14. This nozzle is shorter than the nozzle 15 and its end is also turned laterally so as to direct the flushing stream therefrom into the connection 3. Each of the nozzles 15 and 17 is provided with a spirally formed vane or guide-plate 18 extending from the top thereof to near the outlet. These plates operate to give the stream of water passing through the nozzle a spiral or whirling motion, thereby increasing its effectiveness in dislodging the obstruction.

The flange 11 may be provided with bosses 19 adapted to engage the walls of the trap to assist in positioning the device. The force pump 12 may be of any usual form having a piston 20 operated by a handle 21 or other suitable means.

In operation the device is inserted in the neck of the trap in the position shown in Figure 1 and is positioned by the feet 13 resting on the bottom of the trap and the bosses 19 abutting the sides thereof. There is usually an accumulation of water in the trap, but if such should not be the case, a quantity of water may be inserted through the pipe 8. By operating the pump 12 by working the handle 21 up and down, the water in the trap is drawn into the pump cylinder at each upward stroke of the piston and is forcibly ejected through the nozzles 15 and 17 at each downward stroke thereof. This water emerges from the ends of the nozzles in two spiral or rotating jets which are directed transversely, one along the belly 6 of the trap 1, and the other along the connection 3. These jets impinging upon the obstruction will loosen and disintegrate the material thereof. By continued operation, all of the obstructing material may thus be disintegrated and finally flushed from the pipe. It will be seen, therefore, that a simple and effective device is provided for clearing waste pipes.

It is further pointed out that in accordance with this invention a device is provided by means of which not only can the obstructions in the pipe be cleared, but such clearing can be accomplished with a minimum of inconvenience and manipulation of the fixtures. The neck 7 of the trap in ordinary construction is usually the most accessible point of such a piping system and even when placed a considerable distance under ground, a vertical pipe 8 is ordinarily provided through which access to the trap may be had. This device is adapted to be inserted into this neck of the trap for which purpose it is merely necessary to remove whatever covering device may be applied to that neck and then insert the cylinder 12. Upon such insertion the device will be positioned with the assistance of the feet 13 so that directed jets of water may be injected in both directions along the pipe, one through the nozzle 16 along the belly of the trap and the other through the nozzle 17 against any obstruction in the connection 3. It will be seen, therefore, that the purpose of this device may be accomplished with little inconvenience and very quickly.

It is obvious that various changes may be made in details of construction without departing from the spirit of this invention; it is, therefore, to be understood that this invention is not to be limited to the specific details shown and described.

Having thus described the invention, what is claimed is:

1. A device for clearing waste pipes, comprising, a flushing head insertible into a trap, feet on said head adapted to rest on the trap bottom, and a nozzle on said head adapted to direct a flushing stream along the belly of the trap.

2. A device for clearing waste pipes, comprising, a flushing head insertible into a trap, and nozzles on said head adapted to direct flushing streams in different directions along the trap.

3. A device for clearing waste pipes, comprising, a flushing head insertible into a trap, and nozzles on said head, one of which is adapted to direct a flushing stream along the trap and the other of which is adapted to direct a flushing stream into the trap connection.

4. A device for clearing waste pipes, comprising, a flushing head insertible into a trap, means for positioning said head, a nozzle having a tip adapted to direct a flushing stream into the trap connection and a force pump on said head adapted to draw from the trap.

5. A device for clearing waste pipes, comprising, a flushing head insertible into a trap, a nozzle on said head, adapted to direct a transverse flushing stream, and a force pump on said head adapted to draw from the trap.

6. A device for clearing waste pipes, comprising, a flushing head insertible into a trap, means on said head and projecting into the trap for positioning said head, and a nozzle adapted to direct a flushing stream along the belly of the trap.

7. A device for clearing waste pipes, comprising, a flushing head insertible into a trap, means on said head and projecting into the trap for positioning said head, a nozzle adapted to direct a flushing stream along the belly of the trap, and a force pump on said head adapted to draw from the trap.

In testimony whereof I affix my signature this 17th day of May, 1921.

MICHAEL J. HEIDELBERG.